United States Patent
Abolins

[15] 3,671,487
[45] June 20, 1972

[54] GLASS REINFORCED POLYESTER RESINS CONTAINING POLYTETRAFLUOROETHYLENE AND FLAME RETARDANT ADDITIVES

[72] Inventor: Visvaldis Abolins, Delmar, N.Y.
[73] Assignee: General Electric Company
[22] Filed: May 5, 1971
[21] Appl. No.: 140,596

[52] U.S. Cl. ...................260/40 R, 106/15 FP, 260/873, 260/DIG. 24
[51] Int. Cl. ..........................................C08k 1/78
[58] Field of Search ..............260/873, DIG. 24, 40 R; 106/15 FP

[56] References Cited
UNITED STATES PATENTS
3,005,795  10/1961  Busse et al. ...............260/873 X

*Primary Examiner*—Morris Liebman
*Assistant Examiner*—S. M. Person
*Attorney*—William F. Mufatti, Morgan, Finnegan, Durham & Pine, Frank L. Neuhauser, Oscar B. Waddell and Joseph B. Forman

[57] ABSTRACT

Flame retardant thermoplastic molding compositions are provided comprising a normally flammable linear polyester, filamentous glass, a flame retardant agent and a polytetrafluoroethylene resin. The use of the polytetrafluoroethylene resin controls dripping and permits the flame retardant agent to be used in amounts sufficient to render the compositions non-burning or self-extinguishing without detracting from their physical properties.

20 Claims, No Drawings

GLASS REINFORCED POLYESTER RESINS CONTAINING POLYTETRAFLUOROETHYLENE AND FLAME RETARDANT ADDITIVES

This invention relates to flame retardant glass reinforced thermoplastic polyester compositions. More particularly, it pertains to self-extinguishing and non-burning compositions comprising a normally flammable linear high molecular weight polyester, filamentous glass reinforcement, a flame retardant additive and an amount of polytetrafluoroethylene sufficient to retard dripping.

BACKGROUND OF THE INVENTION.

High molecular weight linear polyesters and copolyesters of glycols and terephthalic or isophthalic acid have been available for a number of years. These are described inter alia in Whinfield et al., U.S. Pat. No. 2,465,319 and in Pengilly, U.S. Pat. No. 3,047,539. These patents disclose that the polyesters are particularly advantageous as film and fiber-formers.

Such polyesters have not been widely accepted for use as molding resins, however, until only fairly recently, because of their relative brittleness in thick sections when crystallized from the melt. This problem was overcome by varying the crystal texture, e.g., by using two step molding cycles or including nucleating agents, and by molecular weight control. This permitted the marketing of injection moldable poly(ethylene terephthalates) which typically, in comparison with other thermoplastics, offer a high degree of surface hardness and abrasion resistance, and lower surface friction.

Simultaneously with the development of injection molding grades of polyester resins, fiber glass reinforced compositions were also provided. See Furukawa et al., U.S. Pat. No. 3,368,995. These injection moldable compositions provided all of the advantages of unfilled polyesters and, also, because of the glass reinforcement, the molded articles had higher rigidity, yield strength, moldulus and impact strength.

However, although the thermoplastic polyesters, particularly when reinforced with glass fibers, are very useful materials, their application has been severly hindered by the fact that they burn readily and are extremely difficult to render fire retardant.

It has been proposed to incorporate non-conventional compounds, such as tetrabromophthalic anhydride, to render glass filled polyester compositions flame retardant, but this is not satisfactory to meet Underwriters' Laboratories specification. Moreover, some degradation is seen; the burning material drips and can ignite combustible materials beneath it; and after-glow remains as a substantial problem. Three main factors apparently are responsible for the unusual difficulty in rendering the new injection moldable polyester compositions fire retardant — in comparison with other thermoplastics, for example. These factors are:
 a. common flame retardant additives, e.g., phosphorus compounds and antimony compounds, do not appear to be very effective when used with polyesters;
 b. polyesters have a tendency to drip while burning, and it is difficult to prevent the dripping even with fibrous glass reinforcement; and
 c. polyesters are subject to serious degradation in the presence of a number of conventionally used flame retardants, with a loss in physical properties.

It has now been found that if flame retardant agents are used in thermoplastic polyesters in combination with polytetrafluoroethylene and glass, the dripping of the composite during burning is controlled. Furthermore, the amount of flame retardant agent appears to be easier to optimize — i.e., less is required, when the polytetrafluoroethylene resin is present. Moreover, there appears to be a beneficial cooperative effect if both the flame retardant and polytetrafluoroethylene dripping retarding agents are present. In addition, if the materials are compounded carefully, having due regard to the sensitive nature of the polyester, and attention is paid to careful drying of the resin and all other ingredients prior to compounding, the previously encountered degradation in physical properties is not seen.

DESCRIPTION OF THE INVENTION.

According to this invention there are provided flame retardant, glass reinforced thermoplastic compositions for molding, e.g., injection molding, compression molding, transfer molding, and the like, comprising
 a. a normally flammable high molecular weight linear polyester resin;
 b. filamentous glass in an amount of from about 5 to about 90 percent by weight based on the combined weight of the glass and the resin;
 c. a flame-retardant additive in a minor proportion based on the composition but in an amount at least sufficient to render the polyester resin non-burning or self-extinguishing; and
 d. a polytetrafluoroethylene resin in a minor proportion based on the composition but in an amount at least sufficient to render the polyester resin non-dripping (if burning).

When used herein, the terms "non-burning," "self-extinguishing" and "non-dripping" are used to describe composites which meet the standards of ASTM test method D–635 and Underwriter's Laboratories Bulletin No. 94. In a modification of this test, a molded piece of about 2½ × ½ × ⅛ inch is formed from the composition and if it does not drip upon ignition — sufficiently to ignite a piece of cotton 12 inches beneath — and will extinguish itself within 30 seconds, after two 10-second ignitions, the composition is deemed to be non-dripping and flame-retardant to the point where it satisfies the requirements set forth by the Underwriter's Laboratories. ASTM Test D–635 for flammability comprises contacting the end of a specimen ½ by 5 inches and "thickness normally supplied" with a Bunsen burner flame for 30 seconds; and repeating if there is no ignition. If the specimen does ignite but does not continue burning to the 4 inch mark, after the flame is removed, it is classed as "self-extinguishing by this test."

The higher molecular weight, normally flammable, linear polyesters used in the present compositions are polymeric glycol esters of terephthalic acid and isophthalic acids. They are available commercially or can be prepared by known techniques, such as by the alcoholysis of esters of the phthalic acid with a glycol and subsequent polymerization, by heating glycols with the free acids or with halide derivatives thereof, and similar processes. These are described in U.S. Pat. No. 2,465,319 and U.S. Pat. No. 3,047,539, and elswhere.

Although the glycol portion of the polyester can contain from two to ten carbon atoms, it is preferred that it contain from two to four carbon atoms, in the form of linear methylene chains.

Preferred polyesters will be of the family consisting of high molecular weight, polymeric glycol terephthalates or isophthalates having repeating units of the general formula

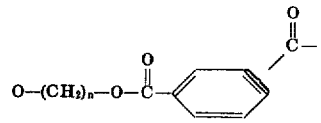

wherein $n$ is a whole number of from 2 to 4 and mixtures of such esters, including copolyesters of terephthalic and isophthalic acids over the entire composition range.

Especially preferred polyesters are poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terephthalate).

Illustratively, high molecular weight polyesters will have an intrinsic viscosity of at least about 0.4 deciliters/gram as measured in o-chlorophenol, a 60/40 phenol-tetrachloroethane mixture of a similar solvent at 25°–30° C.

The filamentous glass to be employed as reinforcement in the present compositions is well known to those skilled in the art and is widely available from a number of manufacturers.

For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about one-eighth to about 2 inches long. In articles molded from the compositions, on the other hand, even shorter lengths will be encountered because, during compounding, considerable fragmentation will occur. This is desirable, however, because the best properties are exhibited by theromplastic injection molded articles in which the filament lengths lie between about 0.000005 and 0.125 (one-eighth) inch.

In general, best properties will be obtained if the sized filamentous glass reinforcement comprises from about 5 to about 90% by weight based on the combined weight of glass and resin, and preferably from about 5 to about 60 percent by weight. Especially preferably the glass will comprise from about 5 to about 40 percent by weight based on the combined weight of glass and resin. Generally, for direct molding use, up to about 60 percent of glass can be present without causing flow problems. However, it is useful also to prepare the compositions containing substantially greater quantities, e.g., up to 80–90 percent by weight of glass. These concentrates can then be custom blended with resins that are not glass reinforced to provide any desired glass content of a lower value.

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in the present compositions. Sizings, if present, can readily be removed by heat cleaning or other techniques well known to those skilled in the art.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus and nitrogen. It is preferred that the flame-retardant additive comprise a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds or a mixture of two or more of the foregoing.

The amount of flame-retardant additive used is not critical to the invention, so long as it is present in a minor proportion based on said composition — major proportions will detract from physical properties — but at least sufficient to render the polyester resin non-burning or self-extinguishing. Those skilled in the art are well aware that the amount will vary with the nature of the resin and with the efficiency of the additive. In general, however, the amount of additive will be from 0.5 to 50 parts by weight per hundred parts of resin. A preferred range will be from about 3 to 25 parts and an especially preferred range will be from about 8 to 12 parts of additive per 100 parts of resin. Smaller amounts of compounds highly concentrated in the elements responsible for flame-retardance will be sufficient, e.g., elemental red phosphorus will be preferred at 0.5 to 2.0 parts by weight per hundred parts of resin, while phosphorus in the form of triphenyl phosphate will be used at 25 parts of phosphate per 100 parts of resin, and so forth. Halogenated aromatics will be used at 8 to 12 parts and synergists, e.g., antimony oxide,will be used at about 2 to 5 parts by weight per 100 parts of resin.

Among the useful halogen-containing compounds are those of the formula

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; amine; a sulfur containing linkage, e.g., sulfide, sulfoxide, sulfone; a phosphorus-containing linkage; and the like. R can also consist of two or more alkylene or alkylidene linkages connected by such groups as aromatic, amino, ether, carbonyl, sulfide, sulfoxide, sulfone, a phosphorus-containing linkage, and the like. Other groups which are represented by R will occur to those skilled in the art.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl, e.g., phenyl, nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are biphenyls of which the following are representative:

2,2-bis-(3,5-dichlorophenyl)propane
bis-(2-chlorophenyl)methane
bis-(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,6-bis-(4,6-dichloronaphthyl)propane
2,2-bis-(2,6-dichlorophenyl)pentane
2,2-bis-(3,5-dichromophenyl)hexane
bis-(4-chlorophenyl)phenylmethane bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane.

The preparation of these and other applicable biphenyls are known in the art. In place of the divalent aliphatic group in the above examples may be substituted sulfide, sulfoxy, and the like.

Included within the above structural formula are substituted benzenes exemplified by 1,3-dichlorobenzene, 1,4-dibromobenzene, 1,3-dichloro-4-hydroxybenzene, hexachlorobenzene, hexabromobenzene, and biphenyls such as 2,2'-dichlorobiphenyl, 2,4'-dibromobiphenyl, and 2,4'-dichlorobiphenyl.

The preferred halogen compounds for this invention are aromatic halogen compounds such as chlorinated benzene, brominated benzene, chlorinated biphenyl, chlorinated terphenyl, brominated biphenyl, brominated terphenyl, or a compound comprising two phenyl radicals separated by a divalent alkylene or oxygen group and having at least two chlorine or bromine atoms per phenyl nucleus, and mixtures of at least two of the foregoing.

Especially preferred are hexabromobenzene and chlorinated biphenyls, alone, or mixed with antimony oxide.

In general, the preferred phosphate compounds are selected from elemental phosphorus or organic phosphonic acids, phosphonates, phosphinates, phosphonites, phosphinites, phosphene oxides, phosphenes, phosphites or phosphates. Illustrative are triphenyl phosphene oxide. This can be used alone or mixed with hexabromobenzene or a chlorinated biphenyl and, optionally, antimony oxide.

Typical or the preferred phosphorus compounds to be employed in this invention would be those having the general formula

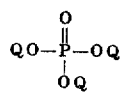

where each Q represents the same or different radicals including hydrocarbon radicals such as alkyl, cycloalkyl, aryl, alkyl substituted aryl and aryl substituted alkyl; halogen; hydrogen and combinations thereof provided that at least one of said R's is aryl. Typical examples of suitable phosphates include, phenylbisdodecyl phosphate, phenylbisneopentyl phosphate, phenylethylene hydrogen phosphate, phenyl-bis-(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis(2-ethylhexyl)phenyl phosphate, tri-(nonyl-phenyl)phosphate, phenylmethyl hydrogen phosphate, di(dodecyl) p-tolyl phosphate, tricresyl phosphate, triphenyl phosphate, dibutylphenyl phosphate, 2-chloroethyldephenyl phosphate, p-tolyl bis(2,5,5'-trimethylhexyl)phosphate, 2-ethylhexyldiphenyl phosphate, diphenyl hydrogen phosphate, and the like. The preferred phosphates are those where each R is aryl. The most preferred phosphate is triphenyl phosphate. It is also preferred to use triphenyl phosphate in combination with hexabromobenzene and, optionally, antimony oxide.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl)phosphine oxide or tetrakis(hydroxymethyl)phosphonium chloride. These flame-retardant additives are commercially available.

The polytetrafluoroethylene resins are commercially available or can be prepared by known processes. They are white solids obtained by polymerization of tetrafluoroethylene in aqueous media with free radical catalysts, e.g., sodium, potassium or ammonium peroxydisulfates at 100 to 1,000 psi. at 0°–200 C. and preferably at 20°–100° C. See Brubaker, U.S. Pat. No. 2,393,967. While not essential, it is preferred to use the resins in the form of relatively large particles, e.g., of average size 0.3 to 0.7 mm, mostly 0.5 mm. These are better than the usual polytetrafluoroethylene powders, which have particles of 0.05 to 0.5 milli$\mu$ in diameter. It is especially preferred to use the relatively large particle size material because it tends to disperse readily in polymers and bond them together into fibrous networks. Such preferred polytetrafluoroethylenes are designated by ASTM as Type 3, and are available commercially from the DuPont Company (TEFLON Type 6) for general use in the extrusion of thin-walled tubular goods and tape.

The compositions of this invention can be prepared by a number of procedures. In one way, glass roving (a bundle of strands of filaments) is chopped into small pieces, e.g., one-fourth to 2 inches in length and put into an extrusion compounder with the polyester resin, flame retardant additive and polytetrafluoroethylene to produce molding pellets. The fibers are shortened and predispersed in the process, coming out at less than one-sixteenth inch long. In another procedure, glass filaments are ground or milled to short lengths, and are mixed with the polyester resin, flame retardant additive and polytetrafluoroethylene resin by dry blending then either fluxed on a mill and ground, or they are extruded and chopped. In still another procedure continuous lengths of glass roving are drawn through a bath of melted polyester resin, flame retardant additive and polytetrafluoroethylene resin which coats the filaments and the resin-coated glass strand is chopped into small cylinders, one-fourth inch or longer, to form a molding compound. The glass fibers can also be mixed with resin and additives and directly molded, e.g., by injection or transfer molding techniques.

It is always very important to thoroughly free all of the ingredients, resin, glass, and flame retardant additives, from as much water as possible.

In addition, compounding should be carried out to insure that the residence time in the machine is short; the temperature is carefully controlled; the frictional heat is utilized; and an intimate blend between the resin and the additives is obtained.

Although it is not essential, best results are obtained if the ingredients are precompounded, pelletized and then molded. Precompounding can be carried out in conventional equipment. For example, after carefully pre-drying the polyester resin and other additives and the glass, e.g., under vacuum at 100° C. for 12 hours, a single screw extruder is fed with a dry blend of the ingredients, the screw employed having a long transition section to insure proper melting. On the other hand, a twin screw extrusion machine, e.g., a 28 mm Werner Pfleiderer machine can be fed with resin and additives at the feed port and glass down stream. In either case, a generally suitable machine temperature will be about 450° to 460° F.

The precompounded composition can be extruded and cut up into molding compounds, such as conventional granules, pellets, etc., by standard techniques.

The compositions can be molded in any equipment conventionally used for glass-filled thermoplastic compositions. For example, with poly(1,4-butylene terephthalate), good results will be obtained in an injection molding machine, e.g., of the Newbury type, with conventional cylinder temperatures, e.g., 450° F. and conventional mold tempratues, e.g., 150° F. On the other hand, with poly(ethylene terephthalate), because of the lack of uniformity of crystallization from interior to exterior of thick pieces, somewhat less conventional, but still well known, techniques can be used. For example, a nucleating agent such as graphite or a metal oxide, e.g., ZnO or MgO, can be included and standard mold temperatures of 150°–200° F. will be used; or, without such agents, mold temperatures of at least 230°F. will be used. These techniques are described at length in Furukawa et al., U.S. Pat. No. 3,368,995, incorporated by reference.

DESCRIPTION OF THE PREFERRED EMBODIMENTS

The following examples illustrate the invention. They are set forth as a further description, but are not to be construed as limiting the invention thereto.

EXAMPLE 1

The following ingredients are dried in a vacuum at 100° C. for 10 hours:

fibrous glass in the form of ⅛ inch chopped glass rovings (497×3, manufactured by Owens Corning Fiberglas Corp.);

poly(1,4-butylene terephthalate), m.p., 225° C., Tg, 36° C., (Vituf 1661, manufactured by Goodyear Tire & Rubber Co.); and finely divided polytetrafluoroethylene resin, average particle size 0.3–0.7 mm. (Teflon No. 6, manufactured by DuPont Company).

The following formulation is prepared:

| Ingredients | Parts by weight |
| --- | --- |
| poly(1,4-butylene terephthalate) | 700 |
| fibrous glass reinforcement | 300 |
| hexabromobenzene | 70 |
| antimony oxide | 30 |
| polytetrafluoroethylene | 15 |

The dry blend is precompounded at 450° F. by passing it through a ¼ inch Wayne single screw extruder. The screw has a long transition section to insure proper melting. The extrudate is pelletized and the pellets are injection molded at 450° F. into test bars measuring ⅛ × ½ × 2½ inches in a 3 oz. Newbury machine. The test bars are subjected to a flammability test and to physical property measurements.

The flammability tests are carried out following Underwriter's Laboratories Subject 94 procedures. A minimum of three bars are tested for burning time after two ignitions. After each (10-second) ignition, the test bar must extinguish itself within 30 seconds, and the bar must not drip during the burning, to be classed as non-burning or self-extinguishing. The physical property tests are carried out by standard procedures: Tensile strength, ASTM D–638; Flexural strength and modulus, ASTM D–790; Impact strength, ASTM D–256; Heat distortion temperature, ASTM D–648. The results are as follows:

| | |
| --- | --- |
| UL 94 flammability (sec.1st/sec.2nd) | 3/2, 6/3, 5/12 (no dripping) |
| Tensile strength, psi | 18,000 |
| Flexural strength, psi | 19,580 |
| Flexural modulus, psi | 975,000 |
| Izod Impact strength, ft.lbs./in. notch | 1.4 |
| Heat distortion temperature, ° F. | 404–406 |
| , ° C. | 207–208 |

It can be seen that the composite according to this invention meets the Underwriter's Laboratories Subject 94 flame retardant requirements.

COMPARATIVE EXAMPLE 1

For comparison purposes, the procedure of Example 1 is repeated omitting the flame retardant agent and the polytetrafluoroethylene resin. The formulation is as follows:

| Ingredients | Parts by weight |
| --- | --- |
| poly(1,4-butylene terephthalate) | 700 |
| fibrous glass reinforcement | 300 |

The flammability and physical property test results are as follows:

| | |
| --- | --- |
| UL 94 flammability (sec.1st/sec.2nd) | burns completely and drips |
| Tensile strength, psi | 17,600 |
| Flexural strength, psi | 25,300 |
| Flexural modulus, psi | 958,000 |
| Izod impact strength, ft.lbs./in. notch | 1.7 |
| Heat distortion temperature, ° F. | 412 |
| , ° C. | 211 |

It can be seen that this composite fails to meet the flammability requirements and, even though the flame retardant additives and polytetrafluoroethylene resin are absent, the physical properties are not markedly higher than those of the composition of Example 1 according to this invention. A comparison of the results demonstrates that compositions according to this invention have unimpaired mechanical strength.

EXAMPLE 2

The procedure of Example 1 is repeated with the following formulation:

| Ingredients | Parts by weight |
| --- | --- |
| poly(1,4-butylene terephthalate) | 700 |
| fibrous glass reinforcement | 300 |
| hexabromobenzene | 85 |
| antimony oxide | 35 |
| polytetrafluoroethylene | 10 |

Flammability and physical test results are as follows:

| | |
| --- | --- |
| UL 94 flammability (sec.1st/sec.2nd) | 5/1, 4/1, 3/2 (no dripping) |
| Tensile strength, psi | 18,300 |
| Flexural strength, psi | 23,700 |
| Flexural modulus, psi | 1,082,000 |
| Izod impact strength, ft.lbs./in. notch | 1.5 |
| Heat distortion temperature, ° F. | 406–408 |
| , ° C. | 208–209 |

It can be seen that a composite according to this invention is obtained which readily meets UL 94 flammability requirements and there is no loss in physical strength in comparison with the control (comparative Example 1).

EXAMPLE 3

A composition according to this invention is prepared and processed by direct molding; no pre-compounding is used. The ingredients are dried, as specified in Example 1, then the polyester pellets are blended with the glass and the flame retardant additive and polytetrafluoroethylene and this dry blend is injection molded in a 3 oz. Newbury machine (cylinder, 450° F.; mold, 150° F.) directly into test bars, ⅛ × ½ × 2½ inches.

The following formulation is prepared:

| Ingredients | Parts by weight |
| --- | --- |
| poly(1,4-butylene terephthalate) | 700 |
| fibrous glass reinforcement | 300 |
| hexabromobenzene | 70 |
| antimony oxide | 30 |
| triphenyl phosphate | 30 |
| polytetrafluoroethylene | 10 |

Flammability and physical test results are as follows:

| | |
| --- | --- |
| UL flammability (sec.1st/sec.2nd) | 1/3, 1/2, 7/7 (no dripping) |
| Tensile strength, psi | 18,500 |
| Flexural strength, psi | 23,800 |
| Flexural modulus, psi | 975,000 |
| Izod impact strength, ft.lbs./in. notch | 1.6 |
| Heat distortion temperature, ° F. | 403 |
| , ° C. | 206 |

COMPARATIVE EXAMPLE 2

For comparison purposes, the procedure of Example 1 is repeated omitting the flame retardant agent and the polytetrafluoroethylene resin. The formulation is as follows:

| Ingredients | Parts by weight |
|---|---|
| poly(1,4-butylene terephthalate) | 700 |
| fibrous glass reinforcement | 300 |

The flammability and physical property tests are as follows:

| | |
|---|---|
| UL 94 flammability (sec.1st/sec.2nd) | burns completely and drips |
| Tensile strength, psi | 19,300 |
| Flexural strength, psi | 27,400 |
| Flexural modulus, psi | 957,000 |
| Izod impact strength, ft.lbs./in. notch | 2.0 |
| Heat distortion temperature, °F. | 417–419 |
| °C. | 214–215 |

It can be seen that this composition fails to meet the flammability requirements and that the physical properties are not substantially better than those of the corresponding flame retardant composition according to this invention (Example 3).

EXAMPLE 4

The following formulation is prepared:

| Ingredients | Parts by weight |
|---|---|
| poly(ethylene terephthalate) | 830 |
| fibrous glass reinforcement | 170 |
| hexabromobenzene | 100 |
| triphenyl antimony | 37 |
| mineral oil | 20 |
| polytetrafluoroethylene | 20 |

The pellets of resin and dispersed glass are mixed with the mineral oil until they have an oily, slightly tacky, uniform coating. The solid fire retardants and polytetrafluoroethylene resin are added gradually and the mix is agitated manually for about 10 minutes, then extruded in a ¾ inch Wayne Laboratory extruder at 590° F. and 50 rpm. The extrudate is cut into pellets and these are injection molded in a 6 oz. VanDorn machine under the following conditions: temp., cylinder, nozzle, 450° F.; cylinder, front and middle, 470° F.; cylinder, rear, 450° F.; temperature, mold, 260° F.; Pressure injection, 200 psi; pressure, plasticizing, 100 psi; cycle time, 55 seconds. The dimensions of the specimens are ⅛ × ½ × 2½ inches. Flammability and physical property test results are as follows:

| | |
|---|---|
| UL 94 flammability (sec. 1st/sec. 2nd) | 2/0, 4/1, 4/0, 1/9 (no dripping) |
| Ten | |
| Tensile strength, psi | 10,400 |
| Flexural strength, psi | 14,480 |
| Flexural modulus, psi | 900,000 |
| Izod impact strength, ft. lbs./in. notch | 0.56 |
| Heat distortion temperature, °F. | 401 |
| °C. | 205 |

It can be seen that the composition according to this invention containing the normally flammable poly(ethylene terephthalate) meets the Underwriter's Laboratories requirements.

COMPARATIVE EXAMPLE 3

For comparison purposes, the procedure of Example 4 is repeated omitting the flame retardant agent and the polytetrafluoroethylene resin. The formulation is as follows:

| Ingredients | Parts by weight |
|---|---|
| poly(ethylene terephthalate) | 830 |
| fibrous glass reinforcement | 170 |

The flammability and physical property test results are as follows:

| | |
|---|---|
| UL 94 flammability (sec.1st/sec.2nd) | Burns completely and drips |
| Tensile strength, psi | 15,900 |
| Flexural strength, psi | 23,340 |
| Flexural modulus, psi | 937,000 |
| Izod impact strength, ft.lbs./in. notch | 0.60 |
| Heat distortion temperature, °F. | 410 |
| °C. | 210 |

It can be seen that this composite fails to meet the flammability requirements and, even though the flame retardant additives are absent, the physical properties, particularly flexural modulus, impact resistance and heat distortion temperature are not significantly better than those of the composition of Example 4 according to this invention.

EXAMPLE 5

The procedure of Example 1 is repeated using the following formulations:

| Example | Ingredients | Parts by weight |
|---|---|---|
| 5 | poly(1,4-butylene terephthalate) | 700 |
| | fibrous glass reinforcement | 300 |
| | hexabromobenzene | 70 |
| | polytetrafluoroethylene | 10 |
| 6 | poly(1,4-butylene terephthalate) | 700 |
| | fibrous glass reinforcement | 300 |
| | hexabromobenzene | 70 |
| | antimony oxide | 30 |
| | triphenylphosphine oxide | 30 |
| | polytetrafluoroethylene | 10 |
| 7 | poly(1,4-butylene terephthalate) | 700 |
| | fibrous glass reinforcement | 300 |
| | hexabromobenzene | 70 |
| | triphenyl antimony | 30 |
| | polytetrafluoroethylene | 15 |
| 8 | poly(1,4-butylene terephthalate) | 700 |
| | fibrous glass reinforcement | 300 |
| | brominated hydrocarbon (CD–140, GAF Corporation) | 50 |
| | antimony oxide | 30 |
| | polytetrafluoroethylene | 10 |
| 9 | poly(1,4-butylene terephthalate) | 700 |
| | fibrous glass reinforcement | 300 |
| | brominated hydrocarbon (CD–140) | 50 |
| | antimony oxide | 30 |
| | triphenyl phosphate | 30 |
| | polytetrafluoroethylene | 10 |
| 10 | poly(1,4-butylene terephthalate) | 700 |
| | fibrous glass reinforcement | 300 |
| | brominated hydrocarbon (CD–140) | 50 |
| | antimony oxide | 30 |
| | triphenylphosphine oxide | 30 |
| | polytetrafluoroethylene | 10 |

| 11 | poly(1,4-butylene terephthalate) | 700 |
| | fibrous glass reinforcement | 300 |
| | brominated hydrocarbon (CD-140) | 50 |
| | triphenyl antimony | 30 |
| | polytetrafluoroethylene | 10 |
| 12 | poly(1,4-butylene terephthalate) | 700 |
| | fibrous glass reinforcement | 300 |
| | brominated hydrocarbon (CD-140) | 70 |
| | polytetrafluoroethylene | 15 |
| 13 | poly(1,4-butylene terephthalate) | 700 |
| | fibrous glass reinforcement | 300 |
| | highly chlorinated diphenyl (Arochlor 1268, Monsanto Co.) | 80 |
| | antimony oxide | 40 |
| | polytetrafluoroethylene | 15 |
| 14 | poly(1,4-butylene terephthalate) | 700 |
| | fibrous glass reinforcement | 300 |
| | highly chlorinated diphenyl (Arochlor 1268) | 80 |
| | antimony oxide | 40 |
| | triphenyl phosphate | 30 |
| | polytetrafluoroethylene | 15 |
| 15 | poly(1,4-butylene terephthalate) | 700 |
| | fibrous glass reinforcement | 300 |
| | highly chlorinated diphenyl (Arochlor 1268) | 80 |
| | antimony oxide | 40 |
| | triphenylphosphine oxide | 30 |
| | polytetrafluoroethylene | 15 |
| 16 | poly(1,4-butylene terephthalate) | 700 |
| | fibrous glass reinforcement | 300 |
| | highly chlorinated diphenyl (Arochlor 1268) | 80 |
| | triphenyl antimony | 40 |
| | polytetrafluoroethylene | 15 |
| 17 | poly(1,4-butylene terephthalate) | 700 |
| | fibrous glass reinforcement | 300 |
| | red phosphorus | 10 |
| | polytetrafluoroethylene | 10 |
| 18 | poly(1,4-butylene terephthalate) | 700 |
| | fibrous glass reinforcement | 300 |
| | phosphorus-halogen containing compound (RF-272, American Cyanamid Co.) | 20 |
| | polytetrafluoroethylene | 10 |
| 19 | poly(ethylene terephthalate) | 830 |
| | fibrous glass reinforcement | 170 |
| | hexabromobenzene | 70 |
| | cresyldiphenyl phosphate | 30 |
| | antimony oxide | 30 |
| | polytetrafluoroethylene | 10 |
| 20 | poly(ethylene terephthalate) | 830 |
| | fibrous glass reinforcement | 170 |
| | hexabromobenzene | 100 |
| | mineral oil | 20 |
| | polytetrafluoroethylene | 20 |
| 21 | poly(ethylene terephthalate) | 830 |
| | fibrous glass reinforcement | 170 |
| | red phosphorus | 30 |
| | mineral oil | 20 |
| | polytetrafluoroethylene | 20 |

These compositions according to this invention provide flame retardant glass fiber-reinforced molded articles.

EXAMPLE 22

The procedure of Example 1 is repeated substituting for the lightly sized 497×3 glass fiber reinforcement, an unsized, short fiber reinforcement (Vitro-Strand, Johns-Manville Sales Corp.). The resulting composition has an exceptionally high degree of flame retardance.

The procedure of Example 1 is repeated, substituting for the lightly sized 497×3 glass fiber reinforcement, one containing a fire retardant sizing, prepared as follows: glass fibers containing about 1.2percent by weight of a thermoplastic styrene-ethyl acrylate copolymer sizing material (HR-3250, manufactured by Pittsburgh Plate Glass Co.) are dispersed in a 15 percent by weight chloroform solution of chlorinated biphenyl (Arochlor 1,268) then the solvent is evaporated during 4 to 5 hours in a forced air oven until the glass is dry and free flowing. The resulting composition has an exceptionally high degree of flame retardance.

EXAMPLE 23

The procedure of Example 1 is repeated, substituting for the poly(1,4-butylene terephthalate), the following normally flammable high molecular weight linear polyesters:

a 60/40 ethylene terephthalate-ethylene isophthalate copolyester having an intrinsic viscosity of 0.674 (U.S. Pat. No. 3,047,539, Example 3); and poly(1,3-propylene terephthalate) prepared from trimethylene glycol and methyl terephthalate by the procedure of U.S. Pat. No. 2,465,319, Example 12.

Flame retardant glass-reinforced polyester compositions are obtained.

Because of their excellent physical, mechanical, chemical, electrical and thermal properties and their enhanced flame resistance, the resin-glass composites of this invention have many and varied uses. The molding powder formulations may be used alone or mixed with other polymers and may contain various fillers, such as wood flour, diatomaceous earth, carbon black, and the like, as well as pigments and dyes, stabilizers, plasticizers, and the like.

Obviously, other modifications and variations of the present invention are possible in the light of the above teachings. It is therefore, to be understood that changes may be made in the particular embodiments of the invention described which are within the full intended scope of the invention as defined by the appended claims.

I claim:

1. A flame retardant, glass reinforced thermoplastic composition for molding comprising
   a. a normally flammable high molecular weight linear polyester resin,
   b. filamentous glass, in an amount of from about 5 to about 90 percent by weight based on the combined weight of said glass and said resin,
   c. a flame-retardant additive in a minor proportion based on said composition but in an amount at least sufficient to render said polyester resin non-burning or self-extinguishing and
   d. a polytetrafluoroethylene resin in a minor proportion based on said composition but in an amount at least sufficient to render said polyester resin non-dripping.

2. A composition as defined in claim 1 wherein said polyester is selected from the group consisting of polymeric glycol terphthalate and isophthalate esters having repeating units of the general formula

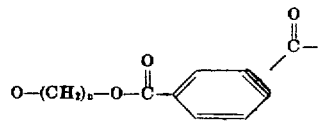

wherein n is a whole number of from 2 to 4, and mixtures of such esters.

3. A composition as defined in claim 2 wherein said polyester is poly(ethylene terephthalate).

4. A composition as defined in claim 2 wherein said polyester is poly(1,4-butylene terephthalate).

5. A composition as defined in claim 1 wherein said flame retardant additive is a halogen-containing compound; a halogen-containing compound in admixture with antimony oxide; elemental phosphorus or a phosphorus compound; a halogen-containing compound in admixture with a phosphorus compound; a compound containing phosphorus-nitrogen bonds; or a mixture of the foregoing, and said compound is present in an amount of from 0.5 to 50 parts by weight per hundred parts of said resin.

6. A composition as defined in claim 5 wherein said halogen containing compound is an aromatic halogen containing compound selected from the group consisting of chlorinated benzene; brominated benzene; chlorinated biphenyl; chlorinated terphenyl; brominated biphenyl; brominated terphenyl; a compound comprising two phenyl radicals separated by a divalent alkylene or oxygen group and having at least two substituents selected from the group consisting of chlorine and bromine per phenyl radical; and a mixture of at least two of the foregoing.

7. A composition as defined in claim 6 wherein said organic halogen compound is hexabromobenzene.

8. A composition as defined in claim 6 wherein said organic halogen compound is a chlorinated biphenyl.

9. A composition as defined in claim 5 wherein said flame retardant additive is hexabromobenzene in admixture with antimony oxide.

10. A composition as defined in claim 5 wherein said flame retardant additive is selected from the group consisting of elemental phosphorus; organic phosphonic acids, phosphonates, phosphinates, phosphonites, phosphinites, phosphine oxides, phosphines, phosphites, phosphates and mixtures of any of the foregoing.

11. A composition as defined in claim 10 wherein said flame retardant additive is triphenyl phosphate.

12. A composition as defined in claim 5 wherein said flame retardant additive is a mixture of hexabromobenzene, antimony oxide and triphenyl phosphate.

13. A composition as defined in claim 5 wherein said flame retardant additive is a mixture of hexabromobenzene and triphenyl phosphate.

14. A composition as defined in claim 10 wherein said flame retardant additive is triphenyl phosphine oxide.

15. A composition as defined in claim 5 wherein said flame retardant additive is a mixture of hexabromobenzene, antimony oxide and triphenyl phosphine oxide.

16. A composition as defined in claim 5 wherein said flame retardant additive is a mixture of a chlorinated biphenyl and triphenyl phosphine oxide.

17. A composition as defined in claim 1 wherein said polytetrafluoroethylene resin is present in an amount of from 0.5 to 2.5 parts by weight per hundred parts of said resin.

18. A self-extinguishing and non-dripping reinforced thermoplastic composition for molding comprising
a. a normally flammable high molecular weight linear poly(1,4-butylene terephthalate);
b. filamentous glass reinforcement, in the form of dispersed fibrous chopped strands, in an amount of from 5 to 40 percent by weight based on the combined weight of said glass and said resin;
c. as a flame retardant additive a mixture of hexabromobenzene, from about 8 to about 12 parts by weight per hundred parts by weight of said resin, and antimony oxide, from about 2 to about 5 parts by weight per hundred parts by weight of said resin; and
d. a polytetrafluoroethylene resin, from about 0.5 to 2.5 parts by weight per hundred parts by weight of said resin.

19. A composition as defined in claim 18 wherein the surface of said glass reinforcement is substantially free of sizing and the filament lengths in said glass are between about 0.000005 and about 0.125 inch.

20. A composition as defined in claim 17 wherein the polytetrafluoroethylene resin has an average particle size of from about 0.3 to about 0.7 millimeters, before blending.

* * * * *